Sept. 24, 1940.  O. C. SCHMIDT  2,216,023
GRINDER
Filed June 28, 1939  2 Sheets-Sheet 1
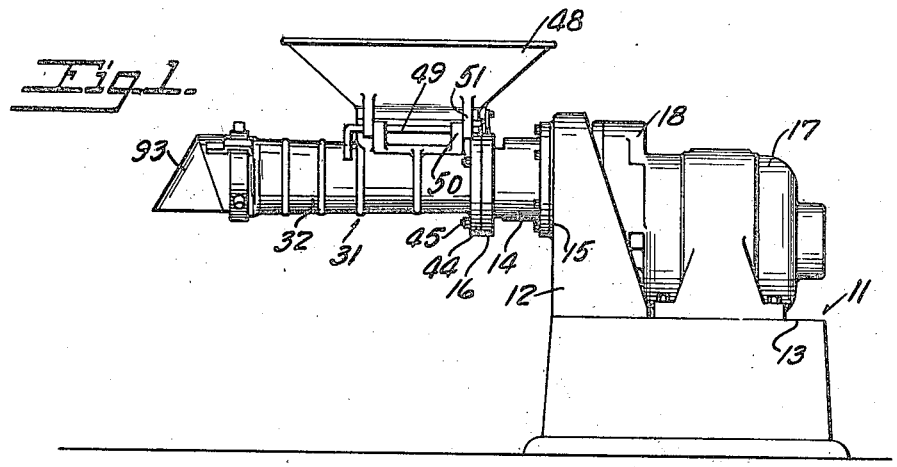
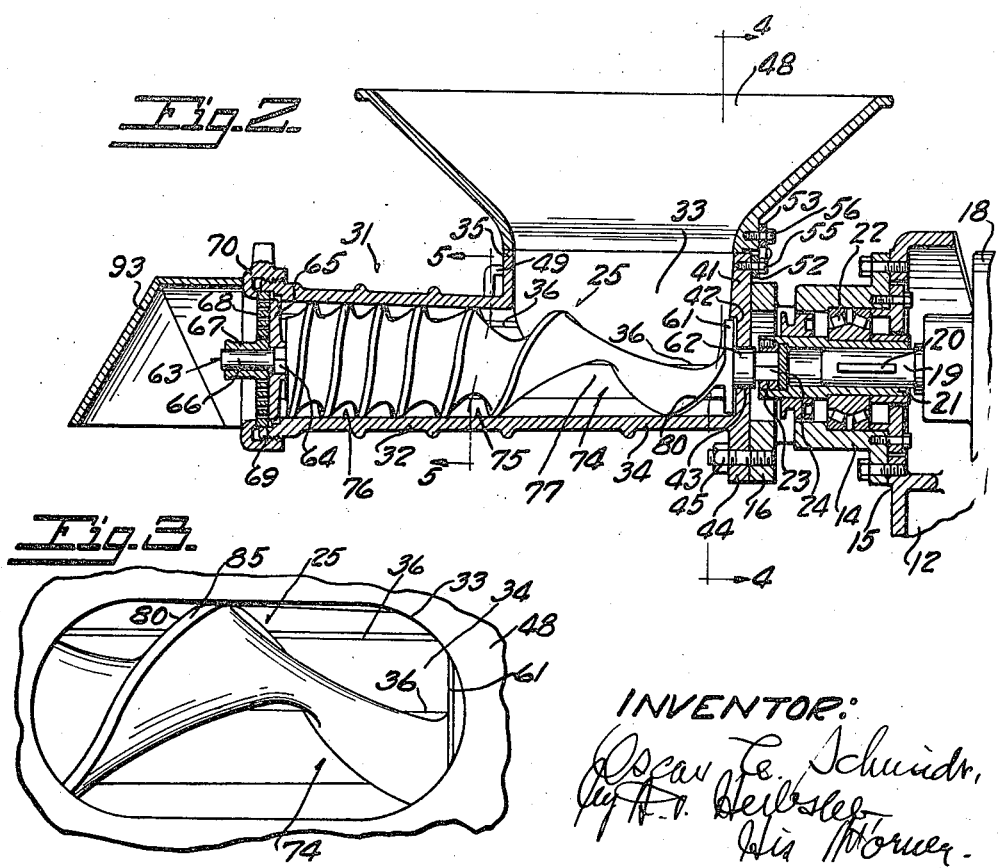
INVENTOR:
Oscar C. Schmidt, Sept. 24, 1940. O. C. SCHMIDT 2,216,023
GRINDER
Filed June 28, 1939 2 Sheets-Sheet 2
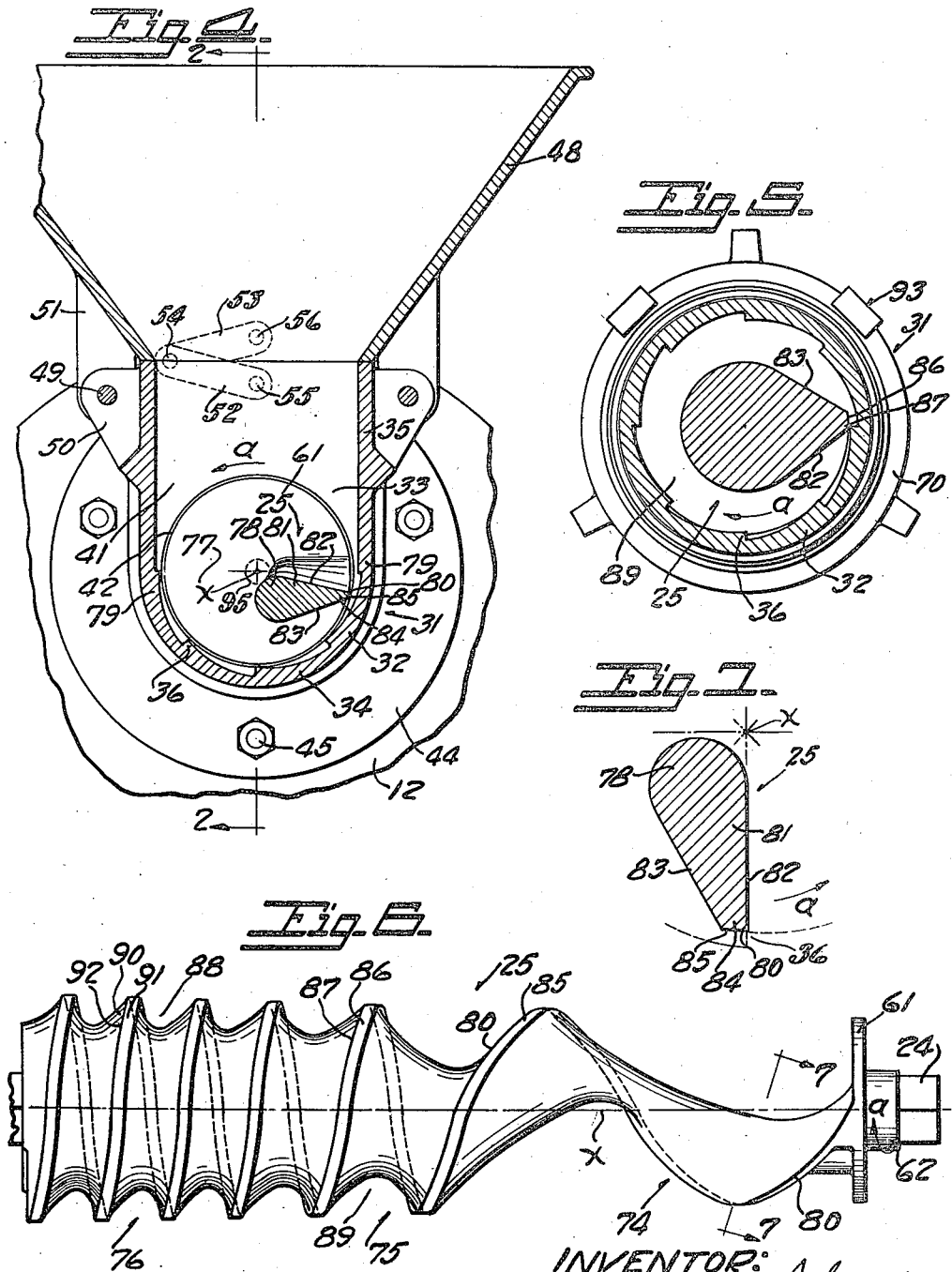

Patented Sept. 24, 1940

2,216,023

UNITED STATES PATENT OFFICE 2,216,023

GRINDER

Oscar C. Schmidt, Cincinnati, Ohio, assignor to The Cincinnati Butchers' Supply Company, Cincinnati, Ohio, a corporation of Ohio Application June 28, 1939, Serial No. 281,613

8 Claims. (Cl. 146—189)

My invention relates to grinders employing a feed worm and used, for instance, in the meat industry for grinding meats and for similar purposes. It is the object of my invention to provide a grinder of the character mentioned of large feeding capacity, and so constructed that the meats fed thereinto will have a continuous forward movement and will readily have such forward movement applied thereto when received into the machine.

Machines of this character usually comprise a hopper into which the material is placed, the hopper communicating with a meat channel comprising a tubular portion at the outfeeding end of which there is a perforate plate through which the meat is forced, and in connection with which there is a rotary cutter for cutting the meat into small particles, a feed worm being located in the channel for feeding the meat. The hopper, the channel and the worm have heretofore been usually so constructed and related that positive feeding of the meat into the channel has been uncertain, with the result that a retracting movement was imparted to the meat, moving the meat upward into the hopper, which resulted in danger to the operator who under such circumstances attempted to force the meat toward the worm and into the channel by hand, often resulting in injury to the operator and giving rise to an unsanitary condition, as in modern meat reducing practice manual contact of the meat is discountenanced.

I have avoided these objections in my improved device and have provided means whereby feeding movement is imparted to the meat to positively direct it into the feeding channel, and means whereby retracting movement of the meat is avoided or minimized, and have provided means whereby the meat when fed in large chunks is immediately reduced to smaller pieces as it is being fed into the channel for ready reception into the channel and for great capacity in the feeding action.

My invention consists in novel means for accomplishing these objects; further, in a novel structure of feed worm; and, further, in novel structure and arrangement of the walls of the channel coacting therewith; and the invention will be further readily understood from the following description and claims, and from the drawings, in which latter:

Fig. 1 is a side elevation of my improved device.

Fig. 2 is a vertical longitudinal axial section of the same, taken in the plane of the line 2—2 of Fig. 4, partly broken away, and showing the feed worm in side elevation.

Fig. 3 is a plan view showing the feeding in portion of the machine, partly broken away.

Fig. 4 is a cross-section of my improved device, taken in the plane of the irregular line 4—4 of Fig. 2, and partly broken away.

Fig. 5 is a cross-section of the same, taken in the plane of the irregular line 5—5 of Fig. 2.

Fig. 6 is a side elevation of the feed worm, partly broken away, the threads of the worm being completed in dotted lines; and Fig. 7 is a cross-section of the same, taken on the line 7—7 of Fig. 6.

In the present exemplification there is a frame 11 provided with a column 12 and a shelf 13, a sleeve 14 being secured to the upright face 15 of the frame, the sleeve having an outer flange 16. Driving means are shown as an electric motor 17 suitably secured to the shelf and provided with a speed gear reduction unit 18 terminating in a power delivering shaft 19 having drive connection 20, as a key, with a driving sleeve 21 journaled in a bearing 22 in the sleeve 14. The driving sleeve 21 is provided with a power connecting recess 23 having a pluri-sided wall forming releasable driving connection with a similar cross-sectionally formed stub 24 on a feed worm 25. This drive connection may be of any suitable kind or structure for ready attachment and release of the worm with relation to its driving shaft.

A feed housing 31 comprises a tubular feeding channel 32 which is abbreviated at one side of one end thereof to form a feed opening 33 opposite a tubular infeeding sector 34, having a cross-sectional wall concentric about the axis of the tubular channel. The tubular channel tapers toward its inner end for ready endwise outward removal and inward replacement of the feed worm and ready connection and disconnection of the driving connection 23, 24 between the power shaft and the feed worm. The opening 33 forms a mouth for said channel, said mouth having surrounding walls 35 extending from said opening. The opening or mouth is preferably elongated lengthwise of the channel. The inner wall of the channel is preferably provided with inwardly extending meat contacting ribs 36, these ribs being abbreviated at the feeding-in mouth but continuing along the infeeding sector 34.

The infeeding end wall 41 of the channel housing is provided with an inner rabbet 42, from which a bearing 43 extends, and said housing is provided at its infeeding end with a flange 44, which in the present exemplification is secured to the flange 16 of the sleeve 14 by means of suitable studs and nuts 45 for clamping said housing in outwardly projecting relation to the frame.

A suitable hopper 48 is provided for the mouth of the feeding channel, and is shown pivoted at its respective sides to the feeding housing on pivot pins 49, either of which may be released for swinging the hopper in opposite directions, these pivot pins being located in lugs 50, 51, extending respectively from the housing and the hopper. Links 52, 53 are pivoted together on a pivot pin 54 at one of their ends, the other ends being pivoted respectively to the housing by a pivot pin 55 and to the hopper by a pivot pin 56, to limit opening movement of the hopper in either direction.

The feed worm 25 is rotatable in the channel. It is provided at its infeeding end with an annular flange 61 received in the rabbet 42, with a journal stub 62 located in the bearing 43 and with the drive connecting stub 24. The feed worm is at its outfeeding end provided with a stub 63 secured to said outer end and having an inner clutch section 64 about which a usual knife structure 65 is located so as to rotate with the worm, and an outer journal section 66 rotatable in a bearing 67 of a usual perforated knife plate 68 stationarily located in an annular rabbet 69 at the outer end of the tubular feed section, and held in place by a usual clamp nut 70.

The feed worm comprises an initial or infeeding section 74, an intermediate feeding section 75, and a delivering feeding section 76 to deliver the meat being fed into coaction with the rotary knife and the perforated feed plate. In order to provide for maximum feeding capacity and to cut chunks of meat being fed into smaller pieces for ready feeding of the same, I have provided a feed worm of novel construction in which the infeeding section has a maximum space 77 between its base 78 and the opposed portion 79 of the concentric wall of the infeeding sector of the feed channel, so as to provide great width of space between such portions of said worm and said wall in order to readily receive large chunks of meat, and I have provided the outer peripheries of such portions of the feed worm with a knife edge 80 to act upon the chunks of meat, the knife edge coacting with the wall of the infeeding sector for dividing the meat chunks and reducing the meat into smaller pieces for ready feeding of the meat lengthwise of the feeding channel.

This infeeding section of the feed worm preferably has a single convolution, the pitch whereof is of the length of the infeeding opening 33, and constructed preferably in the form of a helical or serpentine twist about the axis of rotation of the feed worm and cross-sectionally located throughout a portion of its length substantially at one side of said axis in progressive cross-sectional planes of the feed worm, and having an orbit planetariwise about its axis of rotation.

This portion of the feed worm is preferably devoid of a central shaft. The body of this portion of the feed worm comprises cross-sectionally the inner base or heel 78, from which a shank 81 projects outwardly at one side thereof, forming sides 82, 83, which converge toward the outer end of such cross-sectional part of the feed worm to provide a toe 84, preferably having an outer arcuate end 85 concentric with the channel sector and provided with the knife edge 80 at its forward or advancing edge, the feed worm being exemplified as rotating in the direction of the arrow a. The side 82 of this body of the feed worm forms a propelling or feeding side for the feed worm and is of substantial width, extending into the cross-sectional space usually occupied by the shaft of the feed-screw heretofore usually employed in machines of this character, thereby providing a maximum width of feeding face rotatable in the feeding sector.

The knife edge 80 extends helically and concentrically about the axis of rotation of the feed worm and coacts progressively with said ribs at the infeeding sector lengthwise of the feed worm for cutting the meat into pieces, the ribs also retarding rotation of the meat with the feed worm, to advance the meat lengthwise of the feeding channel. The feed worm throughout a substantial portion of the infeeding section thereof is preferably, as hereinbefore described, of the same cross-sectional form throughout succeeding cross-sectional planes of the feed worm, being similar to each other throughout a substantial portion of the length of the infeeding convolution of the feed worm. The cross-sectional form is similar throughout the balance of said infeeding convolution, although the feed worm may increase in cross-sectional area at the outfeeding end of said infeeding convolution. Dispensing with the usual central shaft for the feed worm provides greater meat space in the channel for greatly increasing the infeeding space between the feed worm and the wall of the channel sector and enables great width of feeding face to be employed for advancing the meat along the channel for enhancing the quantity of meat being fed and the speed with which it is fed lengthwise of the feeding channel.

The intermediate portion of the feed worm is located substantially in the infeeding portion of the cross-sectionally closed tubular feed channel. The outfeeding portion of the infeeding section of the feed worm merges with the infeeding portion of the intermediate section of the feed worm. The cross-sectional area of the feed worm in this intermediate section increases relatively to the cross-sectional area of the outfeeding end of the infeeding section of the feed worm, the tear drop cross-sectional form of the infeeding section of the feed worm being preferably continued, but cross-sectionally enlarged in the infeeding portion of the intermediate section of the feed worm. The convolution of this intermediate section is preferably substantially shorter than the convolution of the infeeding section of the feed worm, and has an outer marginal face 86 provided with a cutting edge 87, extending helically along said intermediate section, such marginal face being a continuation of the arcuate end 85 and such cutting edge being a continuation of the cutting edge 80.

The outfeeding section of the feed worm is provided with a series of convolutions, four of these being shown, which are successively continuations of the convolution in the intermediate section of the feed worm, the body portions of said convolutions being of slightly greater cross-sectional area than the body portions of the outfeeding end of the intermediate convolution, and provided with a helical feeding channel 88, which is a continuation of the helical feeding channel 89 of the intermediate section and having feed ridges 90 therebetween provided with an outer marginal face 91, which is a continuation of the marginal face 86 of the intermediate section and provided with a cutting edge 92, which is a continuation of the cutting edge 87 of the intermediate section. The helical feeding channels of the outfeeding section are preferably less in cross-section than the cross-section of the preceding intermediate section for compressing the meat and forcing it forward lengthwise of the feeding channel into coaction with the rotating knife structure 65 and the perforated knife plate 68 for forcing the meat through the perforations and cutting the meat portions in the perforations from the body of meat in the feeding channel, rotation of the meat with the feed worm being resisted by contact of the meat with the ridges 36. The outer end of the feed housing may be provided with a deflecting shield 93 to deflect the meat issuing from the machine downwardly.

In the present exemplification of my invention the top of the hopper with the machine on the floor is preferably at about shoulder height of an operator, convenient for the operator to feed, fork or otherwise place the meat or other material into the hopper without manually touching the meat, and the tubular housing is of sufficient height above the floor so that a usual wheeled meat or material truck may be inserted therebelow for receiving the discharging cut meat or material.

Instancing the material as meat, this may be fed into the hopper in chunks, whence it descends by gravity into the feeding mouth and projects therethrough into the infeeding sector of the feeding channel and into the progressively advancing space between the heel of the infeeding section of the feed worm and the wall of the infeeding sector, whence it is drawn inwardly by the advancing infeeding side of the infeeding convolution of the feed worm and the helical cutting edge along the outer circumference of such infeeding section. The helical cutting edge coacts with the wall of the infeeding sector of the meat channel for cutting the chunks of meat into smaller pieces and such advancing infeeding side advances the same along the meat channel by coaction thereof with the ribs of the feed channel. The infeeding or advancing face of such infeeding portion of the infeeding section of the feed worm is of substantial width for supplying maximum amount of feeding area cross-sectionally of the feed worm for such advancement of the material.

Such coaction with the meat also avoids or minimizes undue upward movement of the cut meat in the infeeding section to prevent movement of the meat retractingly into the mouth and hopper and for insuring advance movement of the meat lengthwise of the feeding sector into the intermediate section of the feed worm, which is surrounded by the tubular wall of the feeding channel, to insure further advance movement of the cut meat into said intermediate section and thence into the helical channel of the outfeeding section of the feed worm to insure rapid and continuous advancement of the meat without rotation in the tubular casing and with coaction of the knife edges throughout their various helical contours with the ribs throughout the feeding channel for further reducing the meat in the feeding channel by coaction between said knife edges and said ribs.

Referring to Figs. 4, 6 and 7, an infeeding portion of the worm, in its cross-sectional planes, moves about the axis of rotation $x$ of the worm, the infeeding face 82 and the heel 78 moving planetariwise about said axis and about a central body of meat, indicated by the dotted circle 95 in Fig. 4. The helical infeeding face 82 is of such form as to push the meat lengthwise of the worm toward the annularly closed portion of the feeding channel, and, aided by the gravity of the meat and by the movement of the heel 78 about the central body 95 of meat, which helps in anchoring the meat downwardly, pushes the meat downwardly into the cross-sectional space 77 of greater width than half of the diameter of the lower sector of the infeeding portion of the feeding channel, the meat being also cut by the cutting edge 80 of the toe end of the feed worm to reduce the meat and aid in the ease of its movement in feeding direction.

My invention provides extremely efficient feeding of the meat and its reduction into smaller particles and enhances the feeding capacity and speed of a machine of this character.

It is obvious that changes in structures, relations and arrangements of parts from what is herein particularly shown and described may be made without departing from the spirit of my invention or the scope of the accompanying claims.

I claim:

1. A feed worm for a grinder of the character described comprising an infeeding portion which in cross-sectional planes is formed as a heel and a shank projecting outwardly therefrom and terminating in an outer peripheral toe having a cutting edge all movable planetariwise about, spaced from and substantially at the same side of the axis of rotation of the feed worm and substantially spaced from said axis so as to leave a central core of the material in said axis to anchor the material downwardly during the feeding and cutting operation.

2. A combined feeding and cutting worm for a grinder of the character described comprising a helical portion at its infeeding end which in its successive cross-sectional planes has an orbit spaced from its axis of rotation so as to leave a central body of material surrounding said axis during the cutting and feeding operation, and further comprising other helical portions toward its outfeeding end, which in their successive cross-sectional planes are located in said axis to incorporate said central body of material among other portions of said material.

3. In a grinder of the character described, the combination of a housing in which there is a tubular feeding channel for the material, said tubular feeding channel provided with cutting ribs extending lengthwise of said channel and being abbreviated at one side of one end thereof to form an elongated feeding opening into said channel, and a feed worm in said feeding channel provided with an infeeding convolution having a pitch of substantially the length of said feeding opening and located during a portion of its length substantially wholly at one side of its axis of rotation throughout progressive cross-sectional portions of said feed worm, and throughout said progressive cross-sectional portions comprising a heel substantially spaced from said axis so as to leave a central body of material in said axis, a cutting edge coacting with said cutting ribs and an intermediate feeding side to move the balance of the material in said cross-sectional plane downwardly about said central body.

4. A cutting feed worm for a grinder of the character described having a shaftless infeeding convolution which cross-sectionally throughout progressive cross-sectional planes consists of a heel at one side of the axis of rotation of the feed worm, with which heel sides merge and extend outwardly to form a toe provided with a cutting edge, said heel, sides and toe being substantially spaced from said axis at said one side so as to form a central core of the material at said axis surrounding said axis during the cutting and feeding operation.

5. In a grinder of the character described, the combination of a housing in which there is a tubular feeding channel abbreviated at one side of one end thereof to form an elongated feeding opening into said channel opposite a tubular sector of said feeding channel, the inner face of said feeding channel being provided with cutting ribs, and a feed worm in said feeding channel provided with an infeeding convolution having an outer peripheral cutting edge coacting with said cutting ribs and a laterally extending feeding face for the material being cut extending inwardly of said cutting edge, said infeeding convolution having a pitch of substantially the length of said feeding opening and located during a portion of its length substantially wholly at one side of its axis of rotation throughout progressive cross-sectional portions of said feed worm to form an infeeding space thereat between said one side of said axis of rotation and the wall of said tubular sector which crosses said axis of rotation and extends around said axis to form a central space lengthwise of said axis to receive a central portion of the material being fed and cut which is located in and around said axis to aid in the downward movement of the material in said infeeding space by said laterally extending feeding face.

6. In a grinder of the character described, the combination of a housing in which there is a tubular feeding channel abbreviated at one side of one end thereof to form a feeding opening into said channel opposite a tubular sector of said feeding channel, and a helical feed worm in said feeding channel having a cutting edge at its outer periphery and comprising an infeeding portion at said feeding opening located wholly at one side of its axis of rotation and having an inner heel and an intermediate feeding face between said heel and said cutting edge all substantially spaced from said axis of rotation at said one side throughout successive cross-sectional planes to form a cross-sectional feeding space between said infeeding portion and said tubular sector which extends across said axis of rotation constructed to draw the meat being fed downwardly away from said feeding opening into said cross-sectional feeding space and across said axis of rotation into said tubular sector and to cut the meat so being fed by coaction between said cutting edge and the wall of said tubular sector and to advance the cut meat along said tubular sector and to feed it into and through the balance of said tubular feeding channel.

7. In a grinder of the character described, the combination of a housing in which there is a tubular feeding channel abbreviated at one side of one end thereof to form a feeding opening into said channel opposite a curved tubular sector of said feeding channel, and a helical feed worm in said feeding channel having an axis of rotation about which the wall of said tubular sector is curved and comprising a shaftless infeeding portion cross-sectionally comprising a heel the sides of which extend outwardly as a radial shank at one side of said heel terminating in an outer toe, and having a feeding space between the other side of said heel and said curved wall of said feeding sector extending across said axis of rotation and encompassing said axis at all sides thereof, whereby to form a central body of the material being fed at and completely around said axis and extending to said curved tubular sector of said feeding channel during the feeding and cutting operation of said worm.

8. In combination, a housing having a tubular feed passage abbreviated at one side of one end thereof to form a feed opening and the wall of said feed passage being provided with inwardly presented ribs extending lengthwise thereof, and a feed worm comprising a receiving section, an intermediate section and a delivering section, said sections having convolutions provided with a cutting edge at the outfeeding sides of their outer peripheries coacting with said ribs, said receiving section having an initial portion of smaller cross-section located wholly in its cross-sectional planes at one side of the axis of rotation of the worm and spaced from said axis at said one side thereof to form a clear feeding space extending across and about said axis to the wall of said feed passage to form a clear feeding space for the meat extending across said axis to receive chunks of meat between said initial portion and said wall which are cut by said cutting edge into smaller pieces, and a following portion of gradually increasingly larger cross-sectional dimensions located preponderantly at said one side of said axis to continue said feeding space and said cutting, the length of convolution of said receiving section being substantially the same as the length of said feed opening, said intermediate section having a convolution which is of substantially less linear pitch than the pitch of the convolution of said receiving section with which it merges to form a passage between it and said inner wall which becomes gradually shallower toward the outfeeding end of said intermediate section to continue the cutting of the meat and to feed it lengthwise of said tubular feed passage, and said delivering section having convolutions of less linear pitch with which said last-named convolution merges to continue the cutting and feeding of the meat.

OSCAR C. SCHMIDT.